United States Patent Office 2,946,756
Patented July 26, 1960

2,946,756

**RESINS FROM EPOXIDIZED LIQUID POLYBUTA-
DIENE AND NEUTRAL ESTERS OF POLYBASIC
ACIDS**

Charles E. Wheelock and John E. Wicklatz, Bartlesville,
Okla., assignors to Phillips Petroleum Company, a corporation of Delaware No Drawing. Filed Dec. 13, 1957, Ser. No. 702,514

19 Claims. (Cl. 260—2)

This invention relates to resins from epoxidized liquid polybutadiene and neutral esters of polybasic acids. In copending applications, Serial No. 612,890, filed September 28, 1956, and Serial No. 626,286, filed December 5, 1956, of Wheelock, epoxidized diene polymers have been described. These epoxy compounds are those wherein an oxygen atom bridges adjacent carbon atoms, said carbon atoms being joined by a single valence bond. It is further disclosed therein that these polymers are useful as resins for varying uses such as laminating, casting, and coating compositions. I have now discovered another curing system for epoxidized polymers of this type.

The following are objects of my invention.

An object of this invention is to provide thermosetting resins. A further object of this invention is to provide an improved curing system for epoxidized liquid polybutadiene.

Other objects and advantages of this invention will become apparent to one skilled in the art upon reading the accompanying disclosure.

The present invention relates to thermosetting resins comprising a mixture of epoxidized liquid polybutadiene containing at least 1 percent, preferably 10 to 80 percent, of the total oxygen as hydroxyl oxygen and, based upon 100 parts of said epoxidized polymer, 0.1 to 50 parts of a neutral ester of a polybasic acid. More specifically, these resins comprise a mixture of (A) epoxidized liquid polybutadiene characterized in that the original unsaturated portion of the molecule is converted by the epoxidation reaction to units of which (1) 8 to 70 percent of said units are selected from the group consisting of $$-CH-CH_2-$$
$$\quad\;\;|$$
$$\quad O$$
$$\quad\;\;\backslash$$
$$\quad CH$$
$$\quad\;/$$
$$\quad CH_2$$

and $$-CH_2-CH-CH-CH_2-$$
$$\qquad\;\; \backslash O /$$

(2) up to 82 percent of said units are selected from the group consisting of $$\begin{array}{c} RO-CH_2 \\ RO-CH \\ -CH-CH_2- \end{array}$$

and $$\begin{array}{c} OR\;\;OR \\ |\;\;\;| \\ -CH_2-CH-CH-CH_2- \end{array}$$

where R is selected from the group consisting of H and $$-\underset{\underset{\displaystyle \|}{O}}{C}-R_1$$

where $R_1$ is selected from the group consisting of alkyl, aryl, alkaryl, and aralkyl groups of 1 to 20 carbon atoms and (3) 10 to 35 percent of said units are selected from the group consisting of $$\begin{array}{c} CH_3 \\ \| \\ CH \\ | \\ -CH-CH_2- \end{array}$$

$$\begin{array}{c} H\;H \\ |\;\;| \\ -CH_2-C-C-CH_2- \\ \;\;\;\;\;\backslash\;\;\;/ \\ \;\;\;CH_2\;\;\;CH_2 \\ \;\;\;\;\;\backslash\;/ \\ \;\;\;\;\;C=C \\ \;\;\;\;\;H\;H \end{array}$$

and $$-CH_2-CH=CH-CH_2-$$

at least 1 percent, preferably 10 to 80 percent, of the total oxygen being present as hydroxyl oxygen, and (B) 0.1 to 50 parts of a neutral ester of an acid selected from the group consisting of ortho titanic acid, ortho boric acid, sulfurous acid, and ortho silicic acid and a monohydric aliphatic alcohol boiling below 200° C.

The liquid polymers can be prepared by any suitable method for preparing these including the use of sufficient amounts of mercaptan modifiers in emulsion polymerization systems to produce liquid polymers and by mass or solution polymerization using finely divided alkali metal catalysts. A particularly preferred method is the solution polymerization described in Crouch 2,631,175. The products, following epoxidation, are preferably liquids having a viscosity up to 500,000 centipoises within the temperature range 0 to 100° C.

The epoxidized polymers are blended and reacted with neutral esters in the practice of this invention. The esters which have been found highly effective for development of rigid structures include ester of ortho titanic acid $[Ti(OH)_4]$, boric acid $[B(OH)_3]$, ortho silicic acid $[Si(OH)_4]$ and sulfurious acid $[OS(OH)_2]$. The preferred esters are those of the saturated and unsaturated monohydric alcohols which are liquids having a boiling point below about 200° C. and more preferably below 150° C. Thus, esters of the aliphatic alcohols having one to six carbon atoms are preferred. Examples of these alcohols are methanol, ethanol, 1-propanol, 1-propenol, 2-propanol, 1-butanol, 2-butanol, 2-methyl-1-propanol, 1-pentanol, 2-pentanol, 2,2-dimethyl-1-propanol, 2-methyl-3-butyne-2-ol, 2-methyl-3-butene-2-ol, 2-methyl-1-butanol, 1-hexanol, and allyl alcohol.

In some instances, the esters can be prepared directly from the acid and the alcohol. Alternatively, other methods using, for example, salts of the acids, aliphatic halides, the acid chlorides, etc., can be used. For example, the neutral esters of ortho-silicic acid can be prepared from silicon tetrachloride and ethyl alcohol as indicated by the reaction $$SiCl_4 + 4HOC_2H_5 \rightarrow Si(OC_2H_5)_4 + 4HCl$$

Since sulfurous acid is unstable, indirect means are employed for the production of the corresponding esters.

Examples of these esters include tetraethyl titanate, tetraisopropyl titanate, tetrabutyl titanate, trimethyl borate, triethyl borate, tri-n-amyl borate, dimethyl sulfite, di-hexyl sulfite, divinyl sulfite, di-n-amyl sulfite, tetraethyl silicate, tetra-n-propyl silicate, tert-butyl-tri-n-amyl titanate, methyldiethyl borate and triallyl borate.

The amount of esters to use should be sufficient to accelerate the rate of cure or crosslinking of the polymer. Commonly from 0.1 to 50 parts by weight of ester for each 100 parts by weight of polymer are used. However, larger amounts of ester can be utilized advantageously in some formulations. Many of the preferred esters are liquids which can be easily blended with the polymers and serve simultaneously as a thinner or solvent. However, organic solvents can be mixed with the polymer and/or the ester to give blends which may be readily brushed or sprayed. Suitable solvents include cyclohexanone, chloroform, methyl ethyl ketone, toluene, benzene, xylene, and carbon tetrachloride. Liquid monomers such as styrene which can copolymerize with the polymer can also be effectively used as a thinner.

Pigments, dyes, fillers, catalysts, and hardeners can be blended with these compositions to achieve special effects. Titanium dioxide can be used to formulate a white enamel. Wood flour, glass (powdered, fibrous, cloth), sand, carbon black, mica, asbestos and other resins or plastics can be blended into the mixture.

Acid or basic catalysts or hardeners can be used in conjunction with the polymer-ester mixture, but such reagents are preferably added just prior to use of the mixture. Commonly they can be used in amounts up to 10 percent by weight of the polymer in the mixture. The acid catalysts include the inorganic acids and acid anhydrides such as sulfuric acid, phosphoric acid, phosphorus pentoxide; certain salts of polyvalent metals such as the chlorides of titanium and tin. The basic catalysts include inorganic bases such as lime, lead oxide and sodium hydroxide; and amines such as ethylenediamine.

The conditions for cure of these compositions depends upon the particular compositions. During the initial stages of cure as indicated by absence of gelation, the conditions should prevent undue loss of the ester. Pressure can be applied, if desired, so as to permit increase in temperature without volatilization of the ester. Generally it will be preferred to maintain the temperature between 50 and 200° C., commonly between 75 and 150° C. In some cases it is convenient to maintain a rather constant temperature during the cure period. In other cases, the temperature can be gradually increased.

Curing periods of one to 200 hours at temperatures of 50 to 100° C. can be adequate. At higher temperatures, e.g. 150 to 200° C., the curing period can be on the order of 1 to 10 hours, but longer curing periods can be used if desired.

In the following examples, the base resin was prepared as follows:

Liquid polybutadiene, prepared according to the method of Crouch 2,631,175 and having a viscosity of about 1500 Saybolt Furol seconds at 100° F. and an unsaturation of 80 percent of theoretical, e.g., 0.8 double bond per $C_4$ unit, was stripped in a batch operation by flushing for 45 minutes with nitrogen at a temperature of 190° to 200° C. and at a pressure of 10 to 20 mm. Hg absolute. This polymer was epoxidized by dissolving 432 grams of the polymer in two liters of chloroform to which was added 280 grams of a nuclear sulfonated ion exchange resin (Amberlite IR-120) in the acid form and 35 mls. of glacial acetic acid. The temperature was 43° C. To this mixture there was added 266 grams of 50 percent hydrogen peroxide over a period of 30 to 40 minutes while maintaining the temperature at 43° C. The mixture was stirred for 2.5 hours at this temperature. The ion exchange resin was removed by filtration. Then 500 milliliters of water were added, the aqueous phase was removed, and the polymeric product washed several times with dilute aqueous sodium bicarbonate and then with water. The neutral organic phase was dried over anhydrous sodium sulfate and the solvent was stripped by warming under vacuum.

The thus prepared epoxidized polymer was then analyzed for epoxy oxygen content and total oxygen content. Epoxy oxygen content was determined by the hydrochloric acid-dioxane method given in Organic Analysis, Mitchell et al., volume 1, pages 135-136, Interscience Publishers, Inc., New York (1953). Total oxygen content was determined by pyrolyzing the sample in an atmosphere of nitrogen, converting the oxygen compounds formed to carbon monoxide by passage of the gases over carbon at a temperature of 1120° C., passing the gases through a liquid nitrogen trap to remove interfering substances, oxidizing the carbon monoxide to carbon dioxide by means of copper oxide kept at a temperature of 300° C., collecting the resulting carbon dioxide in a liquid nitrogen trap, and, after pumping out the residual gases by means of a vacuum pump, determining the carbon dioxide manometrically in a standard volume.

Several batches of the polymer were prepared according to the above method and blended. Analysis of this blend showed it to contain 5.4 percent by weight of oxirane oxygen, 1.9 percent by weight of hydroxyl oxygen and a total oxygen content of 9.3 percent on the same basis. Approximately 21 percent of the total oxygen was hydroxyl oxygen. The polymer contained 0.27 atom of epoxy oxygen, 0.09 hydroxyl group, and 0.05 ester group for each aliphatic double bond originally present in the liquid polybutadiene.

The following examples illustrate the curing of the oxygen containing polymer with various neutral esters. The specific amounts shown are given for the purpose of illustration but the invention should not be considered unduly limited thereby.

EXAMPLE I

For each run the above epoxidized polymer was mixed with the ester and the mixtures were placed in closed containers which were placed in an oven maintained at 100° C. Observations were made at various intervals of time. After 168 hours the products were cooled to room temperature and the Shore A hardness was measured. The results presented in Table I, show that the gelation time was reduced by the addition of an ester and the Shore A hardness was increased. After measuring the Shore A hardness, the products were placed in open dishes in a vacuum oven at 110° C. for 66 hours. After removing the products from the oven and cooling to room temperature the Shore D hardness was measured. These results are recorded in the last column of Table I and also show that the ester-epoxidized polymer mixtures cured to a greater extent, as measured by the hardness, than the polymer without ester.

Table I

| Run No. | Ester | Parts Ester/100 parts polymer | Observations at 100° C. after— | | | Shore A hardness after 168 hr. | Shore D hardness |
| --- | --- | --- | --- | --- | --- | --- | --- |
| | | | 25 hr. | 66 hr. | 140 hr. | | |
| 1 | None | 0.0 | Fluid | Thickened. | Gel | 0 | 35 |
| 2 | Tetraisopropyl titanate | 21.3 | Gel | Gel | Gel | 4 | 54 |
| 3 | Tri-n-amyl borate | 27.2 | Fluid | Gel | Gel | 10 | 62 |
| 4 | Di-n-amyl sulfite | 22.2 | Gel | Gel | Gel | 10 | 59 |

EXAMPLE II

The epoxidized liquid polymer previously described was used for the runs shown in Table II below. For these runs, the polymer was mixed with a solution of the titanate in ethanol. The mixtures were cured in open containers in a vacuum oven maintained at 100° C.

These runs show that the rate of cure, as measured by the Shore D hardness, is higher for mixtures containing the ester than for the resin alone.

Table II

| Run No. | Parts/100 parts polymer | | Shore D hardness after curing at 100° C. for— | | | |
|---|---|---|---|---|---|---|
| | Tetra isopropyl titanate | Ethanol | 48 hr. | 96 hr. | 166 hr. | 232 hr. |
| 1 | 0 | 0 | 0 | 1 | 4 | 5 |
| 2 | 0.44 | 0.44 | 6 | 11 | 13 | 14 |
| 3 | 0.87 | 0.87 | 7 | 15 | 17 | 22 |
| 4 | 1.31 | 1.31 | 7 | 15 | 20 | 20 |
| 5 | 1.74 | 1.74 | 10 | 17 | 23 | 25 |
| 6 | 2.61 | 2.61 | 12 | 20 | 25 | 25 |
| 7 | 3.48 | 3.48 | 11 | 20 | 25 | 25 |
| 8 | 4.35 | 4.35 | 15 | 25 | 30 | 32 |

EXAMPLE III

For the formulations shown in Table III below, the epoxidized polymer-ester formulations were mixed with either phosphorus pentoxide or diethylenetriamine. The mixtures were heated 168 hours at 100° C. in closed containers. The Shore D hardness was then measured at room temperature.

These tests when compared with the results of Table I show that phosphorus pentoxide or diethylenetriamine can increase the rate of cure. In making this comparison it should be emphasized that the Shore A scale measures soft gels and rubbers, and the Shore D values apply to the harder plastics.

Table III

| Run No. | Parts per 100 parts of epoxidized polymer | | | | Shore D hardness |
|---|---|---|---|---|---|
| | Ester | Amount | Catalyst | Amount | |
| 1 | Tetraisopropyl titanate | 21.3 | Phosphorus pentoxide | 5 | 52 |
| 2 | Tri-n-amly borate | 27.2 | do | 5 | 9 |
| 3 | Tetraisopropyl titanate | 21.3 | Diethylene triamine | 6 | 27 |
| 4 | Tri-n-amyl borate | 27.2 | do | 6 | 29 |
| 5 | Tetraethyl orthosilicate | 15.6 | Phosphorus pentoxide | 5 | 6 |
| 6 | do | 15.6 | Diethylene triamine | 6 | 54 |

The products prepared according to my invention and as shown in the examples have particular utility in the plastics and coating arts. They provide excellent bases for the production of protective surface coatings, varnishes, enamels, and adhesives. Molded articles can be prepared also. The resins have good heat stability, high electrical resistance, and resistance toward many common solvents, acids and alkalis.

As many possible embodiments can be made of this invention without departing from the scope thereof, it is to be understood that all matter herein set forth is to be interpreted as illustrative and not as unduly limiting the invention.

We claim:

1. A curable composition comprising a mixture of 100 parts (A) epoxidized liquid polybutadiene characterized in that the original unsaturated portion of the molecule is converted by the epoxidation reaction to units of which (1) 8 to 70 percent of said units are selected from the group consisting of

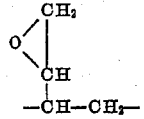

and

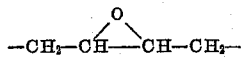

(2) up to 82 percent of said units are selected from the group consisting of

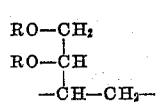

and

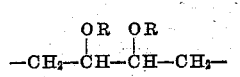

where R is selected from the group consisting of H and

where $R_1$ is selected from the group consisting of alkyl, aryl, alkaryl, and aralkyl groups of 1 to 20 carbon atoms and (3) 10 to 35 percent of said units are selected from the group consisting of

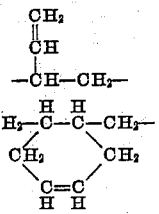

and

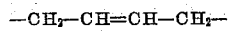

at least 1 percent of the total oxygen being present as hydroxyl oxygen, and (B) 0.1 to 50 parts of a neutral ester of an acid selected from the group consisting of ortho titanic acid, ortho boric acid, sulfurous acid, and ortho silicic acid and a monohydric aliphatic alcohol boiling below 200° C.

2. A curable composition comprising a mixture of 100 parts (A) epoxidized liquid polybutadiene characterized in that the original unsaturated portion of the molecule is converted by the epoxidation reaction to units of which (1) 13 to 50 percent of said units are selected from the group consisting of

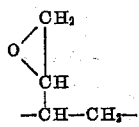

and

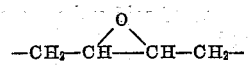

(2) 50 to 77 percent of said units are selected from the group consisting of

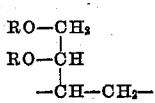

and

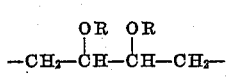

where R is selected from the group consisting of H and

where $R_1$ is selected from the group consisting of alkyl, aryl, alkaryl, and aralkyl groups of 1 to 20 carbon atoms and (3) 10 to 35 percent of said units are selected from the group consisting of

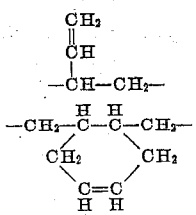

and

−CH₂−CH=CH−CH₂− at least 1 percent of the total oxygen being present as hydroxyl oxygen, and (B) 0.1 to 50 parts of a neutral ester of an acid selected from the group consisting of ortho titanic acid, ortho boric acid, sulfurous acid, and ortho silicic acid and a monohydric aliphatic alcohol boiling below 200° C.

3. The composition of claim 1 wherein said acid is ortho titanic acid.
4. The composition of claim 1 wherein said acid is ortho boric acid.
5. The composition of claim 1 wherein said acid is sulfurous acid.
6. The composition of claim 1 wherein said acid is ortho silicic acid.
7. The composition of claim 1 wherein said neutral ester is tetraisopropyl titanate.
8. The composition of claim 1 wherein said neutral ester is tri-n-amyl borate.
9. The composition of claim 1 wherein said neutral ester is di-n-amyl sulfite.
10. The composition of claim 1 wherein said neutral ester is tetraethyl orthosilicate.
11. The composition of claim 1 containing up to 10 percent by weight of a catalyst selected from the group consisting of stannic chloride, phosphorous pentoxide, and diethylenetriamine.
12. The method of curing epoxizied liquid polybutadiene characterized in that the original unsaturated portion of the molecule is converted by the epoxidation reaction to units of which (1) 8 to 70 percent of said units are selected from the group consisting of

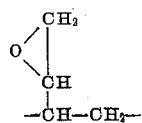

and

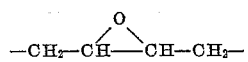

(2) up to 82 percent of said units are selected from the group consisting of

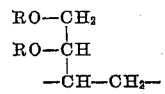

and

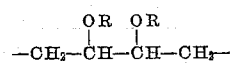

where R is selected from the group consisting of H and

where R₁ is selected from the group consisting of alkyl, aryl, alkaryl, and aralkyl groups of 1 to 20 carbon atoms and (3) 10 to 35 percent of said units are selected from the group consisting of

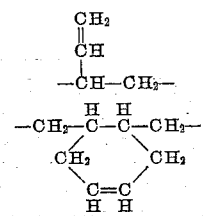

and

−CH₂−CH=CH−CH₂− at least 1 percent of the total oxygen being present as hydroxyl oxygen comprising adding to 100 parts by weight of said material 0.1 to 50 parts of a neutral ester of an acid selected from the group consisting of ortho titanic acid, ortho boric acid, sulfurous acid, and ortho silicic acid and a monohydric aliphatic alcoholic boiling below 200° C., and heating the mixture at a temperature of 50 to 200° C., said heating being sufficient to produce a hard resin.

13. The method of claim 12 wherein said ester is tetraisopropyl titanate.
14. The method of claim 12 wherein said ester is tri-n-amyl borate.
15. The method of claim 12 wherein said ester is di-n-amyl sulfite.
16. The method claim 12 wherein said ester is tetraethyl orthosilicate.
17. A curable composition comprising a mixture of 100 parts of epoxidized liquid polybutadiene containing 9.3 percent total oxygen, 5.4 percent oxirane oxygen, and 1.9 percent hydroxyl oxygen, and 21.3 parts of tetraisopropyl titanate.
18. A curable composition comprising a mixture of 100 parts of epoxidized liquid polybutadiene containing 9.3 percent total oxygen, 5.4 percent oxirane oxygen, and 1,9 percent hydroxy oxygen, and 27.2 parts of tri-n-amyl borate.
19. A curable composition comprising a mixture of 100 parts of epoxidized liquid polybutadiene containing 9.3 percent total oxygen, 5.4 percent oxirane oxygen, and 1.9 percent hydroxyl oxygen and 22.2 parts of di-n-amyl sulfite.

No references cited.

UNITED STATES PATENT OFFICE

CERTIFICATE OF CORRECTION

Patent No. 2,946,756                                      July 26, 1960

Charles E. Wheelock et al.

It is hereby certified that error appears in the printed specification of the above numbered patent requiring correction and that the said Letters Patent should read as corrected below.

Column 8, line 32, for "alcoholic" read -- alcohol --; line 42, after "method" insert -- of --; line 52, for "1,9 percent hydroxy" read -- 1.9 percent hydroxyl --.

Signed and sealed this 4th day of April 1961.

(SEAL)
Attest: ERNEST W. SWIDER

XXXXXXXXX
Attesting Officer

ARTHUR W. CROCKER
Acting Commissioner of Patents